April 7, 1942.     C. C. VENEMAN     2,278,809

BALANCE

Filed April 6, 1940

CARL COOK VENEMAN,
INVENTOR.

BY
*Calvin Brown*
ATTORNEY

Patented Apr. 7, 1942

2,278,809

UNITED STATES PATENT OFFICE 2,278,809

BALANCE

Carl Cook Veneman, Beverly Hills, Calif., assignor of one-half to Leon M. Glaser, Beverly Hills, Calif.

Application April 6, 1940, Serial No. 328,262

3 Claims. (Cl. 265—48)

This invention relates to balances, and particularly to a letter weight or scale.

An object of the invention is the provision of a small device of the character stated, which is inexpensive in cost of manufacture, sightly in appearance, accurate, and which has its parts, members and features arranged in a novel manner.

The invention contemplates, in one embodiment, the use of transparent material, which may be molded to provide a base, a platform, and an envelope adapted to house weight members which are progressively lifted by a beam dependent upon the weight of an object placed upon the platform. The envelope is provided with sight openings and one of the weight members carries indicia adapted to be positioned at said sight openings for indicating directly the postage required for a letter of given weight. In the present invention, the indicia is read directly as to postage required rather than by indicating the weight of the letter in ounces or fractions thereof.

The invention has for a further object a scale wherein the postage rate for local, United States, and Air Mail appears in a line.

Most letter scales incorporate a pointer and a balancing weight, which requires a nicety of adjustment in order to determine accurately the postage required for a letter. With the present invention, the parts are so arranged and the indicia so positioned that the most inexperienced person can readily determine the postage rate for any given letter without calculation or any attempt to balance weights.

Other objects and uses of the invention will become apparent from the detailed specification.

With the above mentioned and other objects in view, including simplicity of structure and ease of use, the invention consists in the novel and useful provision, formation, construction, association, and relative arrangement of parts, members and features, all as shown in a certain embodiment in the accompanying drawing, described generally, and more particularly pointed out in the claims.

Figure 1:
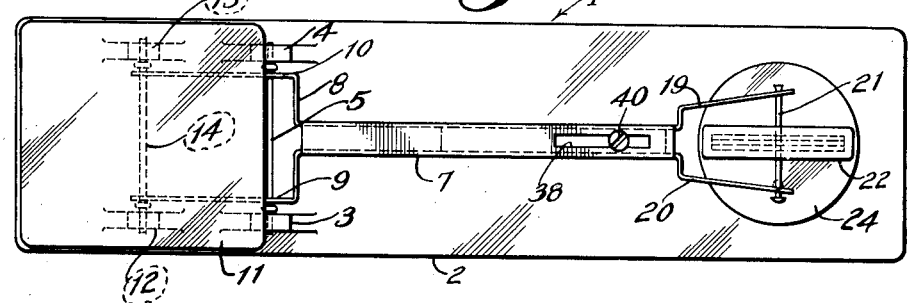
Figure 1 is a top plan view of the improved scale.

Referring now with particularity to the drawing, the improved balance is designated as an entirety, and in one embodiment, by the numeral 1, and the same includes a base 2 provided with a pair of substantially parallel and spaced apart pillars 3 and 4. A pair of spaced apart fulcrum pins 5 and 6 extend between the pillars. A beam 7 is bifurcated at the end 8 to provide a pair of links 9 and 10 both fulcrumed on the fulcrum pin 5. On one side of the pillars is a platform 11, and depending from the under surface of said platform are a pair of fixed links 12 and 13. The outermost ends of the links 9 and 10 are fulcrumed to a fulcrum pin 14 extending between said fixed links 12 and 13. A fulcrum pin 15 spaced from the fulcrum pin 14 the same distance as the spacing between the fulcrum pins 5 and 6, extends between the fixed links 12 and 13. Extending between the fulcrum pins 6 and 15 is linkage, one link of which is shown at 16, the opposite link being identical, with a transverse spacer bar 17 extending between the pair of links. It is evident, therefore, that movement of the beam produces substantially parallel movement of the links so that the platform 11 maintains a position substantially parallel with the base 1. In other words, there is a parallelogram at all times when the links are moved.

The opposite end 18 of the beam is provided with a bifurcated portion, the arms of which are designated as 19 and 20. Adjacent the outer ends of said arms and extending therebetween is a pin 21. This pin is adapted to be centrally disposed relative to certain weight members, which weight members are to be elevated, dependent upon movement of the beam consequent upon the deposit of an object, such as a letter, on the platform 11.

Figures 3, 4:
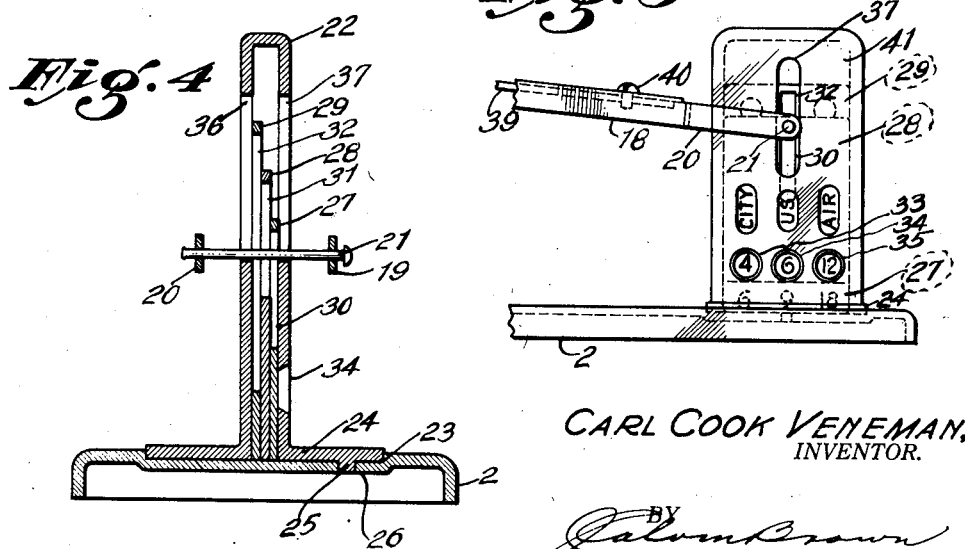
Figure 3 is a fragmentary side elevation showing the indicia bearing weight moved from the position of Figure 2 to indicate a different postage rate, and, Figure 4 is a sectional view on the line 4—4 of Figure 2, and on an enlarged scale.

Specifically, I have provided an envelope or casing 22, which may be conveniently secured to the base 2 in the manner illustrated in Figure 4, wherein it will be observed that the base is provided with a depressed portion 23 adapted to receive the substantially circular base 24 of the casing 22, with an interlocking piece 25 secured to the base 24 on the under surface thereof and passed through an opening 26 in the base 2. This method of securing the casing and the base 2 together is convenient where the scale is constructed of a plastic. The casing 22 is adapted to house a series of weights wherein, in the present instance, three are used, shown at 27, 28 and 29. These weights are in the form of rectangular plates of varying height and arranged in contiguous stepped relationship.

Figure 2:
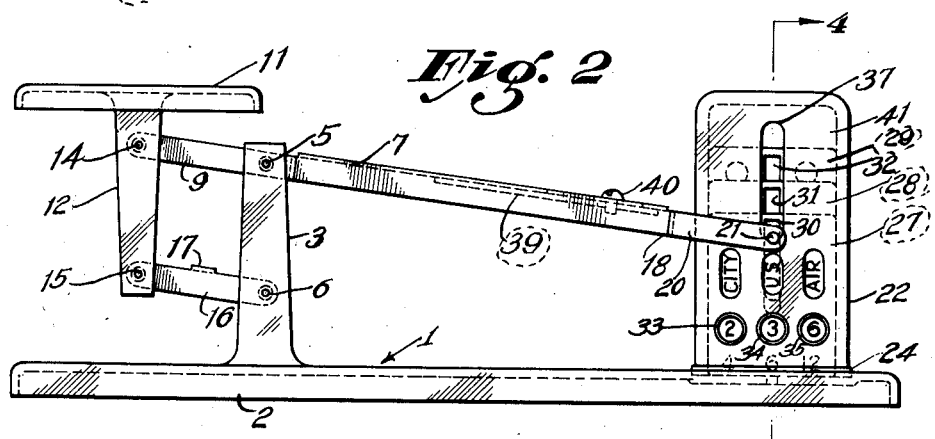
Figure 2 is a side elevation of the scale.

The weights 27 to 29, inclusive, are provided with longitudinal slots 30 to 32, inclusive. Each weight bears separate indicia. For instance, the weight 27 bears on one surface and in one embodiment, indicia visible through sight openings 33 to 35, inclusive, of the casing, reading "4," "6" and "12," in Figure 3, and the same weight likewise bears indicia reading "2," "3" and "6," as shown in Figure 2. The weight 28 bears indicia "6," "9" and "18," and the weight 29 bears indicia consisting of three ciphers.

The casing 22 is provided with slots on opposite side walls thereof, as best shown in Figure 4, at 36 and 37. The pin 21 extends through the slots 36 and 37 and likewise through the slots 30 to 32, inclusive, of the weights. The relationship is such that when the beam 7 is tilted, due to weight placed upon the platform 11, the pin will reach the uppermost excursion of the slot 30 when substantially one ounce of weight on the platform is exceeded, and it will bring into position the indicia reading "4," "6" and "12" of Figure 3. Further weight upon the platform will cause the pin to reach the excursion of movement of the slot in weight 28, and conjointly move both the weights 27 and 28 so that the indicia "6," "9" and "18" is visible through the sight openings. Further tipping of the scale will finally move all of the weights so that the three ciphers are visible through the sight openings.

An adjustable poise is carried by the beam, the said beam being provided with a longitudinal slot 38, and a weight 39 is secured beneath the beam by a screw 40. Adjustment of this weight by turning the screw 40 will serve to correct any error of the scale so far as the poise and counterpoise members are concerned, with the result that a substantially true reading for a given weight placed upon the platform may be observed through the sight openings. While in the present instance the indicia reads directly in postage required, still it is obvious that this indicia might read in ounces, although the necessity of providing indicia in rows would be obviated by the latter reading.

One wall of the casing, to-wit, the wall bearing the indicia and represented as 41, carries notations above the sight openings of "City," "U S," and "Air." Thus, the indicia readings appearing in the sight openings indicate for a given weight of letter the postage required for city mailing, mailing throughout the United States, and for air mail.

Undoubtedly the operation, uses and advantages of the invention are apparent from the description as heretofore given. It may be stated that any number of weights may be provided so that the scale may cover letters, or other devices of greater weight than three ounces.

When indicia indicating postage rate has moved beyond the sight opening, the next postage rate is to be paid, although in the present embodiment of the invention, it is intended that the weights be so balanced that the moment one ounce is exceeded, the first weight 27 will move to position or substantially position the next postage rate before the sight openings.

I claim:

1. In a scale, a base, a casing secured to said base, a weight within the casing, the said weight provided with an elongated slot extending in a substantially vertical direction, said casing being provided with a slot in registry with and of greater height than the slot of the weight, a beam pivoted about a horizontal axis and provided with a bifurcated end, a pin carried by the bifurcated end and passed through the slot of the weight and slot of said casing, a platform secured to the opposite end of said beam, and whereby when the platform is moved, the pin is rocked within the said slots to engage and lift the weight upon a given movement of the platform.

2. In a scale, a base, a casing secured to said base, a weight within the casing, the said weight provided with an elongated slot extending in a substantially vertical direction, said casing being provided with a slot in registry with and of greater height than the slot of the weight, a beam pivoted about a horizontal axis and provided with a bifurcated end, a pin carried by the bifurcated end and passed through the slot of the weight and slot of said casing, a platform secured to the opposite end of said beam, whereby when the platform is moved, the pin is rocked within the said slots to engage and lift the weight upon a given movement of the platform, and indicia carried by the said weight and visible through the said casing to indicate a scale reading.

3. In a letter scale, a base, an upright casing secured to the base, weights within the said casing arranged in contiguous relationship, the said casing provided with a sight opening, and each weight provided with indicia reading in terms of postage required, said casing provided with an elongated slot extending in a substantially vertical direction and the said weights provided, respectively, with elongated slots of different lengths adapted to register with the slot of the casing, the slots in said weights being of shorter length than the slot in said casing, a platform upon which a letter may be placed, a beam pivoted about a horizontal axis and secured to the platform and adapted to be rocked when the platform is depressed, and means secured to said beam and passed through the slot of the casing and the slots of the weights, movement of the beam progressively moving the weights to bring selected indicia before the sight openings.

CARL COOK VENEMAN.